United States Patent [19]

Manuccia et al.

[11] 4,448,000
[45] May 15, 1984

[54] HIGH TEMPERATURE ULTRA-HIGH VACUUM INFRARED WINDOW SEAL

[75] Inventors: Thomas J. Manuccia, Silver Springs, Md.; John R. Peele, Alexandria; Christine E. Geosling, Oakton, both of Va.

[73] Assignee: The United States of America as represented by the Secretary of the Navy, Washington, D.C.

[21] Appl. No.: 372,341

[22] Filed: Apr. 27, 1982

[51] Int. Cl.³ ........................... E06B 3/00; F16D 1/00
[52] U.S. Cl. ............................ 52/208; 285/DIG. 11; 285/DIG. 18; 350/589; 403/288
[58] Field of Search ................. 52/208, 393, 397, 825, 52/171; 285/DIG. 11, DIG. 18, DIG. 19; 403/288; 350/589

[56] References Cited

U.S. PATENT DOCUMENTS

| | | | |
|---|---|---|---|
| 1,733,408 | 10/1929 | Herber | 52/171 |
| 2,269,486 | 1/1942 | Santoro | 285/DIG. 11 |
| 2,528,665 | 11/1950 | Peterson et al. | 285/DIG. 18 |
| 2,584,653 | 2/1952 | Alpert | 403/30 |
| 2,913,780 | 11/1959 | Wiesselberg | 52/171 |
| 3,179,213 | 4/1965 | Kuehne | 52/824 |
| 3,194,364 | 7/1965 | Kolm | 403/30 |
| 3,251,618 | 5/1966 | Kuehne | 52/573 |
| 3,332,566 | 7/1967 | Phillips | 285/364 |
| 3,989,285 | 11/1976 | Yancey | 285/DIG. 18 |
| 4,150,836 | 4/1979 | Walker | 285/DIG. 18 |

FOREIGN PATENT DOCUMENTS 1078733  11/1954  France ...................... 285/DIG. 11

OTHER PUBLICATIONS

NASA, Seals and Sealing Techniques, 1967, p. 5 (top), NASA SP-5905(01).
Hansen and Parsons, "All Metal Sealed Gas Infrared Cell", Technical Report No. 3, Office of Naval Research, Washington, D.C., Aug. 20, 1964.
Schkolnick, "Infrared Windows for Ultrahigh Vacuum Use", Rev. Sci. Inst. 39(1), 122-123, 1968.

Primary Examiner—John E. Murtagh
Assistant Examiner—Andrew Joseph Rudy
Attorney, Agent, or Firm—Robert F. Beers; William T. Ellis; John L. Forrest

[57] ABSTRACT

A window seal apparatus capable of transmitting infrared radiation for use under high temperature ultra-high vacuum conditions. The apparatus includes a window clamped between an annular rim of a clamp flange and an annular rim of a sealing flange. The rim of the sealing flange includes an annular sealing knob machined therein having an annular indentation in its upper surface. An annular lead gasket is located between the sealing knob and one side of the window. An annular lead gasket having roughened surfaces is positioned adjacent to the other side of the window and a TEFLON gasket is positioned adjacent to the annular rim of the clamp flange. A constant force means is provided for pushing the clamp flange toward the window and the sealing flange thereby producing a seal therebetween. The window is preferably formed from alkali halide material.

11 Claims, 3 Drawing Figures

HIGH TEMPERATURE ULTRA-HIGH VACUUM INFRARED WINDOW SEAL

BACKGROUND OF THE INVENTION

The present Invention relates, in general, to a novel window seal capable of transmitting infrared radiation for use under high temperature ultra-high vacuum conditions.

In multiple infrared (IR) photon laser-induced chemistry, the need arises to contain extremely small samples of low-volatility compounds totally in the gas phase at pressures of some millitorr during several hour irradiations with a high power pulsed infrared laser. In practice, the most significant obstacle has been the absence of a non-fragile, large aperture, chemically inert, vacuum window seal capable of long-term operation at temperatures of 200°–275° C. While the ultimate pressures involved are not in the ultra-high vacuum range, sealed-off operation of the cell places equivalent requirements on the leak and outgas rates of the seals. Furthermore, because of the high laser damage thresholds, low indices of refraction, wide spectral passband, and low costs of alkali halides relative to other IR window materials, sealing to ductile-brittle materials such as NaCl, KCl, and KBr is required.

Various methods for sealing infrared windows to metal substrates are known in the art; however, none of these methods are usable under conditions of simultaneous high vacuum and high temperatures. Also, prior art seals are either unable to be temperature cycled or require very long heat-up and cool-down times. For example, O-rings and various elastomer materials all fail between room temperature and approximately 150° C. because of air permeability and sealant decomposition accompanied by continuous outgassing and long-term loss of elasticity. In addition, these materials often show reactivity with various chemical reagents.

Various metallic seals (gold and other overlapped thin wire seals, "K rings") do not have the permeability and outgassing problems of elastomers, but typically fail in the areas of reliability, fragility, difficulty in assembly, and temperature cycling. AgCl seals cannot be used directly on substrates other than silver or gold, are difficult to prepare, and are unreliable in temperature cycled applications.

Silicone resin seals also appear to have problems in temperature cycling in that they require inordinately long times to heat or cool (on the order of weeks) and the seal itself is sensitive to temperature fluctuations. Lead amalgam seals are effective at room temperature but develop leaks at elevated temperatures and also cannot be temperature cycled.

SUMMARY OF THE INVENTION

Accordingly, one object of this Invention is to provide a novel window seal structure which is capable of withstanding high temperature and ultra-high vacuum conditions.

Another object is to provide a novel window seal structure which is temperature cyclable.

Another object is to provide a novel window seal structure which exhibits resistance to thermal shocks similar to that of an unsealed window.

Still another object is to provide a novel window seal structure which is non-fragile.

Still another object is to provide a novel window seal structure which is chemically inert.

Yet another object is to provide a novel window seal structure which is usable in large aperture applications.

Another object is to provide a novel window seal structure which makes use of an alkali halide window.

These and other objectives are achieved in the present Invention by a novel sealing structure which includes a sealing flange member coupled and sealed to an aperture in a body. The sealing flange includes a continuous annular rim. A panel, such as a stainless steel plate or an alkali halide window, includes a first face which is coupled to the rim of the sealing flange by means of a sealing member, such as a lead gasket. A clamp flange member includes a continuous annular rim. This rim is coupled to a second face of the panel by means of a pressure distribution means which distributes forces applied by the rim to the second face of the panel. A constant force apparatus is included for the purpose of pushing the clamp flange toward the sealing flange thereby maintaining a high-vacuum seal between the panel and the sealing flange over a wide range of temperature.

In a novel preferred embodiment of the present Invention the annular rim of the sealing flange includes a continuous raised annular sealing knob in its surface. The sealing knob includes a narrow continuous annular indentation machined in its surface. The sealing member comprises a lead gasket. The pressure distribution means includes a thin continuous annular lead gasket having roughened surfaces positioned adjacent to the second face of the panel and a continuous annular TEFLON (registered trademark) gasket positioned adjacent to the annular rim of the clamp flange. The constant force apparatus includes a plurality of bolts equally spaced about the periphery of the sealing and clamp flanges. Each bolt passes through an opening in the clamp flange and can be received in a threaded hole in the sealing flange or can pass through the sealing flange and be capped with a threaded nut. Constant force springs, such as Belleville-type washers, are located concentric with each bolt and apply force between the head of each bolt and the clamp flange thereby pushing the clamp flange toward the panel and the sealing flange with nearly constant force as differential thermal expansion takes place.

BRIEF DESCRIPTION OF THE DRAWINGS

A more complete appreciation of the Invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
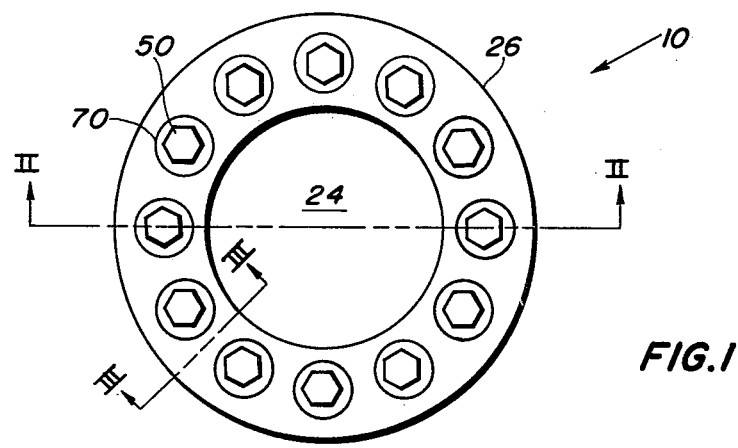
FIG. 1 is a plan view showing the window seal structure of the present Invention.
Figure 2:
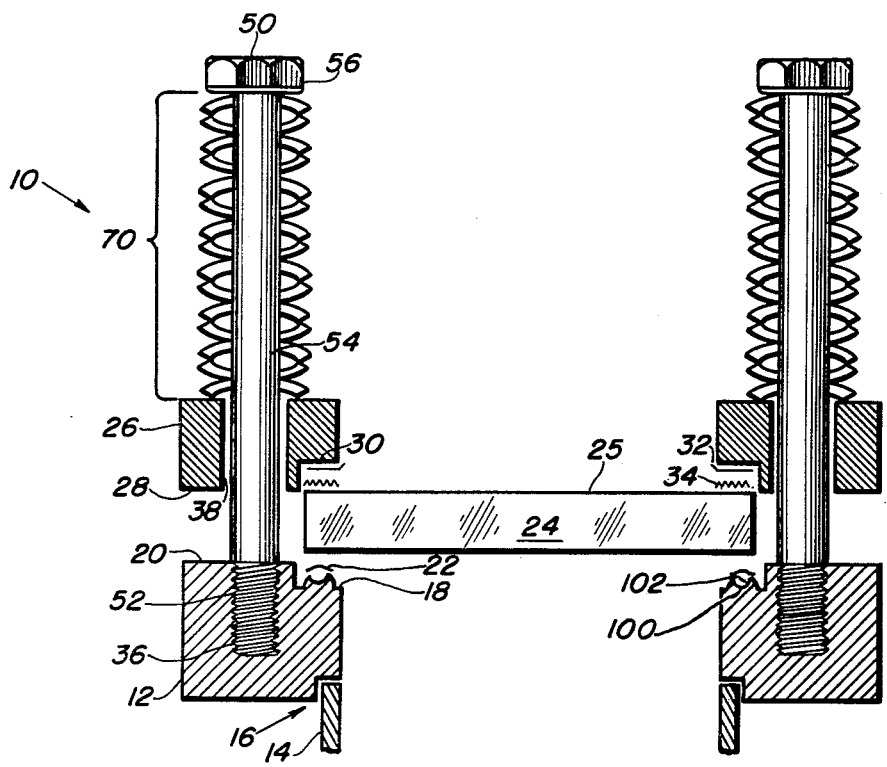
FIG. 2 is a cross-sectional view taken along plane II—II of the window seal structure of the present Invention as shown in FIG. 1.

Referring now to the drawings, wherein like reference numerals designate identical or corresponding parts throughout the several views, and more particularly to FIGS. 1 and 2 thereof, a window seal structure 10 according to a preferred embodiment of the present invention is illustrated as including a continuous annular sealing flange member 12 which surrounds a cylindrical body 14 and which is permanently vacuum sealed thereto by joint 16 in a manner well-known to those skilled in the art, such as by welding. The sealing flange member 12 is preferably made from 304 alloy stainless steel; however, other similar materials could also be utilized.

The sealing flange 12 includes a continuous annular rim 18 formed in the inner periphery of the flange's upper surface 20. The annular rim 18 incorporates a raised continuous annular sealing knob 100 about its upper surface which will be discussed in greater detail below. The annular sealing knob 100 is covered with a continuous annular lead gasket 22 which forms a seal between the sealing knob 100 and an alkali halide window or other panel 24 positioned on top of the lead gasket 22. The window 24 may be any alkali halide material, such as single crystal NaCl, polycrystaline NaCl, or any non-alkali-halide material having a higher (ductile) yield point in compression and a higher (brittle) yield point in tension as compared to NaCl.

The window 24 is held in the window seal structure 10 by means of a continuous annular clamp flange 26 having a continuous annular rim 30 formed in its lower surface 28. The annular rim 30 is positioned generally parallel with the upper surface 25 of the window 24. The clamp flange 26 is preferably made from 304 alloy stainless steel material; however, other similar materials could also be utilized.

The clamp flange 26 applies sealing force to the window 24 through a pressure distribution means including a continuous annular TEFLON (polytetrafluoroethylene) gasket 32 in contact with the rim 30 and a continuous annular lead gasket 34 in contact with the window 24. The gaskets 32 and 34 will be discussed in greater detail below.

The window seal structure 10 is held together by means of a plurality of bolts, such as bolt 50 shown in FIGS. 1 and 2, which are equally spaced about the circumference of the window structure. In the preferred embodiment illustrated herein twelve bolts are utilized. Each of the plurality of bolts and surrounding structures are identical; therefore, only bolt 50 and its surrounding structures will be discussed. Bolt 50 includes a threaded portion 52 which mates with a threaded socket 36 in the sealing flange 12. An unthreaded portion 54 of bolt 50 passes through an opening 38 in the clamp flange 26. The opening 38 has a diameter larger than the diameter of the bolt 50 such that a sliding fit occurs between these parts.

A stack of opposed Belleville-type spring washers 70 are positioned to surround the bolt 50 between the head 56 of the bolt 50 and the clamp flange 26. Together the washers 70 form a constant force Belleville-type spring which acts to push the clamp flange 26 toward the sealing flange 12 thereby compressing the gaskets 22, 32 and 34 against the window 24 to form a seal therewith. In a preferred embodiment, 15 spring washers were used with each of the 12 bolts associated with the window seal structure.

If desired for a particular application, each bolt 50 could pass through the flange 12 and be capped with a threaded nut or other such device to tension the spring washers 70.

The above structure will now be discussed in greater detail by reference to a specific example of a window seal structure 10 which incorporates a 7.6 cm diameter window 24.

Figure 3:
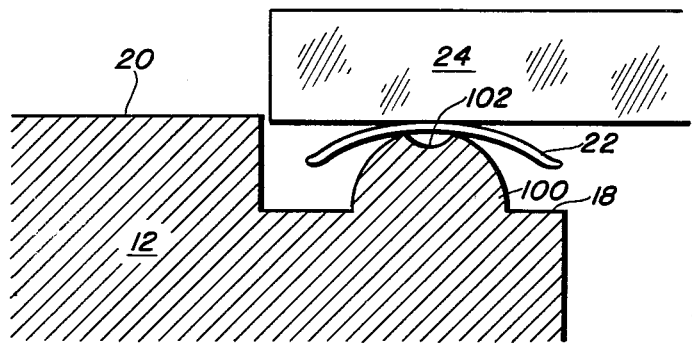
FIG. 3 is a partial cross-sectional view taken along plane III—III of the window seal structure of the present Invention as shown in FIG. 1.

The heart of the window seal structure 10 for a 7.6 cm diameter window is the annular knob 100 which is a polished knob structure having a 6.86 cm inner diameter and a 7.24 cm outer diameter (i.e., a torroid structure cut in half by a plane perpendicular to the centerline of the window seal structure 10) as shown in FIGS. 2 and 3. The knob 100 is formed by machining the 304 alloy stainless steel making up the sealing flange 12. Into the upper surface of the knob 100 is machined a 1.3 mm diameter by 0.19 mm deep semicircular indentation 102. The depth of the indentation should not exceed the uncompressed thickness of the lead gasket 22. The overall shape and relatively small area of this annular surface transmits a minimized total sealing force to a 0.25 mm thick lead gasket 22, generating sufficient pressure to extrude lead from the gasket 22 into the microscale irregularities in the surfaces of the stainless steel and the window material thus achieving a vacuum seal.

The small indentation 102 in the center of the knob 100 serves as a reservoir for lead both during a required initial one-hour, 280°-300° C. setting period as well as in use. This indentation also provides a means by which hydrostatic pressure in the lead gasket 22 can be generated as the knob 100 approaches the window 24 during the initial sealing process. Any ductile deformation (indentation) of the window 24 under the knob 100 serves only to further confine the lead to the high hydrostatic pressure region of the indentation. Without this indentation, complete severing of the lead gasket 22 into two pieces can and does occur, as long-term extrusion removes lead from the center of the knob and thus negates its sealing capabilities. With the indentation, the gasket 22 severs into three pieces, the center one being forced into the indentation with great pressure, often remaining there even after disassembly.

Minimization of the total force applied to the window 24 is very important, particularly when alkali halide materials are used. These materials, while exhibiting a low creep point in compression, particularly at elevated temperatures, show brittle fracture when under minimal local tension. Any common design for a seal involving axial compression of a sealing gasket tends to place the material of the window inside the sealing region into compression. Just outside the sealing region, there may also exist a small zone of positive hydrostatic pressure. Further out, however, there tends to be a region of negative hoop stress (i.e., tension) as the window tries to grow radially to relieve the positive axial stress on it. The magnitude of the negative hoop tension is primarily dependent on the total axial force applied. Thus, it is important to minimize the total force by virtue of a small sealing surface.

Other boundary conditions also affect this zone of potential window failure. Any design which places this zone of negative hoop stress at a surface of the window (either edge or face) will maximize the probability of window failure. This is because most brittle materials, of which glass is the traditional example, will have a lower tensile yield point at a material boundary than in the interior of the material. For this reason, the annular knob 100 is placed considerably inside the edge of the window 24. Similarly, the windows used by the Inventors of the present invention have been relatively thick (8–10 mm) to allow the stress field to dissipate itself somewhat before it impinges on the opposite face of the window.

The details of the clamp flange 26 used to force the window 24 against the annular knob 100 are extremely important in terms of preventing window failure, both in light of the above discussions of local regions of negative stress, as well as experimentally. The Inventors of the present Invention have found that the 7.6 cm diameter window 24 should be supported by an unusually rigid clamp flange 26 (1.5 cm thick stainless steel) attached to the sealing flange 12 by twelve 5/16-18 in. bolts 50 uniformly spaced on an 8.9 cm bolt circle. Both for reasons of uniform initial application of pressure to the window 24 as well as to keep the axial force approximately constant during large temperature changes, these bolts 50 apply their force through a stack of 15 opposed spring washers effectively forming a constant force Belleville spring 70. With this feature, quite large axial differential thermal expansion can be tolerated.

During initial application of force to the window 24, each bolt 50 is lubricated with lubricant appropriate to the temperature of use and carefully torqued in one or two inch-pound increments in an appropriate pattern until the final torque of approximately 5-7 inch-pounds is reached. The lower value is appropriate for single crystal NaCl, while the higher value is for polycrystaline NaCl. This latter material has considerably better material parameters than the single crystal material, and thus it can tolerate a somewhat higher initial sealing force without danger of cracking. The higher initial force increases the probability of a helium leak-free seal probably because of the existence of a threshold strain for creep of the lead into the smallest microscale surface irregularities, even at the elevated setting temperature employed.

Of equal importance to the details of the clamp flange 26 and its attachment to the sealing flange 12 is the nature of the gaskets 32 and 34 used under the clamp flange 26 to protect the window 24 and which comprise the pressure distribution system. On top of the window 24 is placed a 0.25 mm thick lead gasket 34 followed by a 0.125 mm thick teflon gasket 32, and finally, the stainless steel clamp flange 26. It has been experimentally determined that it is important for reliable assembly of the seal that the lead gasket 34 have a roughened surface. The Inventors have achieved this by pounding a small mesh screen (eg. 32 squares/inch) into the lead gasket and then removing the screen. This leaves the desired rough imprint of the screen in the gasket. Presumably, without the surface roughness in the gasket, it acts like a relatively incompressible sheet, assisting in the distribution of only the most small-scale (i.e. sharpest) window/clamp flange surface irregularities. With the roughening, however, extra compressible volume is introduced, allowing more extensive surface mismatches to be successfully accommodated. Other means for accomplishing this result will, of course, be obvious to those skilled in the art.

Of the various considerations that must be made in the design of a window seal, one of the most important is differential thermal expansion. For 304 stainless steel, the coefficient of linear expansion is $20 \times 10^{-6} (K)^{-1}$; for sodium chloride it is $44 \times 10^{-6} (K)^{-1}$. Axial expansion has been overcome by use of the hold-down springs on the clamp flange. The radial expansion problem, on the other hand, is quite difficult to overcome when dealing with such a constrained design problem: flat window, face sealing, materials specified. The lead gasket sealing method described herein makes no specific attempts to overcome this mismatch of about $3 \times 10^{-5} (K)^{-1}$ in linear expansion coefficients, yet seems reasonably immune to repeated temperature cycling. The response of the seal and window combination to thermal shock is quite good, being only slightly poorer than what the unsealed window itself seems able to stand.

As a high temperature, ultra-high vacuum infrared window sealing method, the present Invention has many advantages over other methods. For example, it is capable of long-term operation at temperatures of 200°-275° C. Furthermore, it is temperature cyclable at a very convenient rate (1° C./min) for laboratory scale experiments. The vacuum contained is ultra-high under pump conditions and high vacuum under sealed condition. This is particularly important in the application to multiple IR photon laser induced chemistry where the requirement exists to contain extremely small samples of low volatility compounds totally in the gas phase at pressures of some millitorr for several hours. While the ultimate pressures involved are not in the ultra-high vacuum range, sealed off operation of the cell places equivalent requirements on the leak and outgas rates of the seals. The combination of ultra-high vacuum, temperature range, and cyclibility is not known to be available in any other present infrared window sealing method.

In addition, there are other new and desirable features of the seal. It is chemically inert; the only materials to come into contact with the sample are stainless steel, the salt window, and a very small area of lead. It is non-fragile. The response of the seal and window combination to thermal shock is only slightly poorer than what the unsealed window itself seems able to stand. The seal also shows satisfactory response to mechanical shock and vibration. It can be used in large aperture applications. It makes use of alkali halide windows. This is particularly desirable because of the high laser damage thresholds, low indices of refraction, wide spectral passband, and low cost of alkali halide windows. Few other sealing methods can use these ductile, brittle materials.

The present Invention, although demonstrated with sodium chloride windows, should be generally useful with any window material (IR or otherwise) harder than single crystal NaCl.

The present Invention may also be used for metal to metal seals. Seals of exactly the same design have been in use by the Inventors of the present invention for about 24 months to seal stainless steel to stainless steel. These seals show all of the desirable properties of the window seals, but in addition, are substantially more resistant to thermal shock.

The present Invention is scalable to sizes not specifically described herein. Seals to 2" and 3" windows have been successfully built and tested. Seals to windows of other sizes can be accomplished by dimension scaling with care to duplicate the conditions of minimum, uniform sealing force and high hydrostatic force within the groove on the sealing knob. In addition, other sizes and profiles (eg. parabolic, rectangular with rounded edges) of the knob and groove should provide an equivalent seal to that described herein and have been demonstrated by the Inventors. The semicircular knob profile was chosen for convenience of manufacture. Different sealing forces and other sealing gasket metals may also provide equivalent seals to window materials other than NaCl; however, the onset stress for creep at temperature should be substantially less than that for ductile creep of the window material.

Obviously, numerous (additional) modifications and variations of the present Invention are possible in light of the above teachings. It is therefore to be understood that within the scope of the appended claims, the Invention may be practiced otherwise than as specifically described herein.

What is claimed as new and desired to be secured by Letters Patent of the United States is:

1. A temperature cyclable sealing structure for use under high temperature, high vacuum conditions, comprising:
    a sealing flange member coupled with an aperture in a body and sealed thereto, said sealing flange including a continuous annular rim, said annular rim of said sealing flange including a raised continuous annular sealing knob, said sealing knob including a continuous annular indentation in its upper surface;
    a panel member including a first face coupled to said annular rim of said sealing flange;
    a clamp flange member including a continuous annular rim, said annular rim of said clamp flange being coupled to a second face of said panel member;
    sealing means located between said annular rim of said sealing flange and said first face of said panel member for sealing said first face to said annular rim, said sealing means being positioned such that a portion of said sealing means is located between said first face of said panel member and portions of said sealing knob on each side on said indentation;
    pressure distribution means located between said annular rim of said clamp flange and said second face of said panel member for distributing forces applied by said annular rim of said clamp flange to said second face; and
    constant force means for pushing said clamp flange toward said sealing flange with approximately constant force over a wide temperature range thereby maintaining a high vacuum seal between said panel member and said sealing flange over a wide range of temperatures.

2. The sealing structure as recited in claim 1, wherein: said panel member includes a window formed of alkali halide material.

3. The sealing structure as recited in claim 2, wherein: said window is formed of sodium chloride.

4. The sealing structure as recited in claim 1, wherein: said panel member is formed of stainless steel.

5. The sealing structure as recited in claims 1, 2, 3 or 4, wherein:
    said sealing flange and said clamp flange are made from stainless steel.

6. The sealing structure as recited in claims 1, 2, 3 or 4, wherein said sealing means includes:
    an annular lead gasket positioned between said annular rim of said sealing flange and the first face of said panel member.

7. The sealing structure as recited in claim 1, wherein said sealing means includes:
    an annular lead gasket positioned between said sealing knob and said first face of said panel member.

8. The sealing structure as recited in claims 1, 2, 3, 4 or 7, wherein said pressure distribution means includes:
    a second annular lead gasket having a roughened surface, said second gasket being positioned in contact with said second face of said panel member; and
    an annular polytetrafluoroethylene gasket located between said second gasket and said annular rim of said clamp flange.

9. The sealing structure as recited in claims 1, 2, 3, 4 or 7 wherein said constant force means includes:
    a plurality of bolts rigidly attached to said sealing flange, said plurality of bolts being uniformly spaced about the circumferance of said sealing flange, each of said plurality of bolts passing through corresponding opening in said clamp flange and being movably received therein.

10. The sealing structure as recited in claim 9, wherein said constant force means further includes:
    a plurality of springs, at least one of said plurality of springs being positioned concentric with each of said plurality of bolts and being located between the head of each bolt and a surface of said clamp flange opposite to said annular rim of said clamp flange.

11. The sealing structure as recited in claim 10, wherein each of said plurality of springs includes:
    at least one Belleville-type spring washer.

* * * * *